United States Patent
Kim et al.

(10) Patent No.: US 11,221,888 B2
(45) Date of Patent: Jan. 11, 2022

(54) METHOD AND SYSTEM FOR GPU VIRTUALIZATION BASED ON CONTAINER

(71) Applicant: Lablup Inc., Seoul (KR)

(72) Inventors: Joon Gi Kim, Seoul (DE); Jeong Kyu Shin, Seoul (KR); Jong Hyun Park, Seoul (KR)

(73) Assignee: LABLUP INC., Seoul (KR)

( * ) Notice: Subject to any disclaimer, the term of this patent is extended or adjusted under 35 U.S.C. 154(b) by 122 days.

(21) Appl. No.: 16/859,167

(22) Filed: Apr. 27, 2020

(65) Prior Publication Data

US 2020/0257565 A1 Aug. 13, 2020

Related U.S. Application Data

(63) Continuation of application No. 16/426,335, filed on May 30, 2019, now abandoned, which is a continuation of application No. 16/366,303, filed on Mar. 27, 2019, which is a continuation of application No. PCT/KR2018/016810, filed on Dec. 28, 2018.

(30) Foreign Application Priority Data

Dec. 26, 2018 (KR) .................. 10-2018-0169620

(51) Int. Cl.
*G06F 9/50* (2006.01)
*G06F 9/455* (2018.01)
*G06T 1/20* (2006.01)
*G06F 9/54* (2006.01)

(52) U.S. Cl.
CPC ........ *G06F 9/5055* (2013.01); *G06F 9/45558* (2013.01); *G06F 9/54* (2013.01); *G06T 1/20* (2013.01); *G06F 2009/45562* (2013.01)

(58) Field of Classification Search
None
See application file for complete search history.

(56) References Cited

U.S. PATENT DOCUMENTS 9,256,467 B1 2/2016 Singh et al.
9,420,007 B1 8/2016 Roth et al.
(Continued)

FOREIGN PATENT DOCUMENTS

KR 20060079088 A 7/2006
KR 20090026579 A 3/2009
(Continued)

OTHER PUBLICATIONS

International Search Report dated Sep. 25, 2019 in corresponding International Application No. PCT/KR2018/016810, 5 pages.
(Continued)

*Primary Examiner* — Uzma Alam
(74) *Attorney, Agent, or Firm* — Maier & Maier, PLLC

(57) ABSTRACT

A GPU virtualization method based on a container comprises the steps of: transmitting, if the container is created, a configuration file including GPU resource constraint information and an API profile to the container, by a node controller; and implementing a virtual GPU, when the container is executed, by intercepting a library call and changing an argument related to a GPU resource amount by a library controller provided in the container, and by intercepting a system call and changing argument and return values by a system call controller.

9 Claims, 5 Drawing Sheets

(56) References Cited

U.S. PATENT DOCUMENTS

| | | | |
|---|---|---|---|
| 9,680,772 B2 | 6/2017 | Kothari et al. | |
| 10,606,660 B1* | 3/2020 | Hartley | H04L 41/0896 |
| 10,795,974 B2* | 10/2020 | Karademir | G06F 21/105 |
| 2007/0097132 A1* | 5/2007 | Stauffer | G06T 15/00 |
| | | | 345/502 |
| 2008/0134178 A1 | 6/2008 | Fitzgerald et al. | |
| 2012/0005256 A1 | 1/2012 | Cherukuri et al. | |
| 2013/0155083 A1 | 6/2013 | Mckenzie et al. | |
| 2014/0176583 A1* | 6/2014 | Abiezzi | G06F 9/45533 |
| | | | 345/522 |
| 2014/0181807 A1* | 6/2014 | Fonseca | G06F 9/45558 |
| | | | 718/1 |
| 2014/0344807 A1 | 11/2014 | Bursell et al. | |
| 2016/0232640 A1* | 8/2016 | Zhao | G06F 9/5011 |
| 2017/0132747 A1* | 5/2017 | Wilt | G06F 9/5044 |
| 2017/0269978 A1 | 9/2017 | Engel et al. | |
| 2020/0319925 A1* | 10/2020 | Clampitt, III | G06F 9/5005 |

FOREIGN PATENT DOCUMENTS

| | | | |
|---|---|---|---|
| KR | 101716715 B1 | 3/2017 | |
| KR | 20180045347 A | 5/2018 | |
| WO | WO-2014085785 A2 * | 6/2014 | ............. A63F 13/92 |

OTHER PUBLICATIONS

Decision to Grant dated Sep. 2, 2019 in corresponding Koran Application No. 10-2018-0169620; 3 pages.

European Search Report dated Mar. 27, 2020 in corresponding European Application No. 18863794.6; 8 pages.

Gu, Jing et al., "GaiaGPU: Sharing GPUs in Container Clouds", 2018 IEEE Intl Conf on Parallel & Distributed Processing with Applications, Ubiquitous Computing & Communications, Big Data & Cloud Computing, Social Computing & Networking, Sustainable Computing & Communications; Dec. 11, 2018; pp. 469-476.

* cited by examiner

METHOD AND SYSTEM FOR GPU VIRTUALIZATION BASED ON CONTAINER

CROSS-REFERENCE TO RELATED APPLICATIONS

This application is a continuation of U.S. patent application Ser. No. 16/426,335, filed on May 30, 2019, which is a continuation of U.S. patent application Ser. No. 16/366,303, filed on Mar. 27, 2019, which is a continuation of International Patent Application No. PCT/KR2018/016810, filed on Dec. 28, 2018, which claims priority to Korean Patent Application No. 10-2018-0169620, filed on Dec. 26, 2018. The disclosures of the aforementioned applications are hereby incorporated by reference in their entireties.

FIELD

The invention relates to a method and a system for GPU virtualization based on a container, and particularly, to a method and a system for GPU virtualization based on a container, which implements the GPU virtualization by changing argument values or the like related to GPU resources, by a library controller and a system controller in the container.

BACKGROUND

Recently, virtualization techniques are used much to improve efficiency, security and compatibility of large-scale computing for multiple users. Representatively, there is a virtual machine, which is applied in various fields such as applications, servers, storages, networks and the like. However, although the level of compatibility and isolation is the highest since the virtual machine virtualizes all physical hardware components from CPUs to disks, networks and even I/O devices, there is a disadvantage in that additional consumption (overheads) of computing resources is large.

Meanwhile, containers emerge as a virtualization technique which overcomes the disadvantage of virtual machines by using an isolation technique of an operating system level, not virtualization. The container is implemented in a method of using a virtualized name space of resource elements provided by a completely isolated file system and a kernel as a user level execution environment, while sharing an operating system kernel of a host as a kernel level execution environment. The content of the isolated file system is configured by combining, in one package, an application and all dependencies, libraries, other binaries, configuration files and the like needed for driving the application. The resource elements of the kernel divided in a virtualized name space and provided to the container include a process ID, a network socket, a user account, shared memory for inter-process communication (IPC) and the like. Since the other hardware accesses are processed in the same manner as that of a case not a container, performance of host hardware can be completely used without an overhead. Here, the operating system provides an option for limiting a maximum amount of hardware resources available for each container.

Recently, as deep learning techniques are developed and demands for large-scale computing increase, techniques for optimally sharing and managing computing resources are requested. To improve performance, accelerated processing hardware optimized for characteristics of deep learning operation appears, and a GPU is also one of them. However, a virtualization technique based on a container provided by an existing operating system supports only sharing and limitation of resources for the CPU, memory, disk, and file system of each container, and a technique for simultaneously sharing the accelerated processing hardware like GPU among several containers is not provided. Accordingly, there is a difficulty in efficiently sharing and managing the GPU.

SUMMARY OF THE DISCLOSURE

Therefore, the invention has been made in view of the above problems, and it is an object of the invention to provide a method and a system for GPU virtualization based on a container, which can dynamically allocate and share GPU resources through virtualization of an operating system level, not physical virtualization, using the container.

A GPU virtualization method based on a container according to an embodiment of the invention includes the steps of: transmitting, if the container is created, a configuration file including GPU resource constraint information and an API profile to the container, by a node controller; and implementing a virtual GPU, when the container is executed, by intercepting a library call and changing an argument related to a GPU resource amount by a library controller provided in the container, and by intercepting a system call and changing argument and return values by a system call controller.

A GPU virtualization system based on a container according to an embodiment of the invention includes: an operating system including a node controller for transferring a configuration file including resource constraint information and a system call/API profile to the container; and the container configured of a library controller for determining, when a library function call event of a user application is received, whether the event is an API call related to inquiry and allocation of GPU resources, changing at least one among an argument, a structure field and a return value related to GPU resource amounts, and calling an original library function, and a system controller determining, when a system call event of the user program is received, whether the event is a system call of at least one among permission, block and change according to a predefined API profile, and changing argument and return values before and after a call of original system call according to rules of the API profile.

According to the invention, a GPU computing system, in which a single GPU is allocated to a single container, multiple GPUs are allocated to a single container, a single GPU is shared by multiple containers, or multiple GPUs are shared by multiple containers, can be implemented by expanding a container virtualization technique.

In addition, as the GPU computing system is implemented using a container, compared with a virtual machine, there is an effect in that system resources can be used more efficiently, and update is easy as applications can be moved and the scaling is simple.

DETAILED DESCRIPTION

Examples of specific structural or functional descriptions on the embodiments according to the concept of the invention disclosed in this specification are only to explain the embodiments according to the concept of the invention, and the embodiments according to the concept of the invention may be embodied in a variety of forms and are not limited to the embodiments described in this specification.

Since the embodiments according to the concept of the invention may make diverse changes and have various forms, the embodiments will be shown in the figures and described in detail in the specification. However, this is not intended to limit the embodiments according to the concept of the invention to specific disclosed forms, and the embodiments include all changes, equivalents and substitutions included in the spirit and scope of the invention.

The terms used in this specification are used to describe only particular embodiments and are not intended to limit the invention. A singular expression includes a plural expression unless the context clearly indicates otherwise. In this specification, the terms such as "include" or "have" are to specify the presence of features, integers, steps, operations, components, parts or combinations of these stated in this specification, but do not preclude in advance the presence or addition of one or more of other features, integers, steps, operations, components, parts or combinations of these.

Hereinafter, the embodiments of the invention will be described in detail with reference to the figures attached in this specification.

Figure 1:
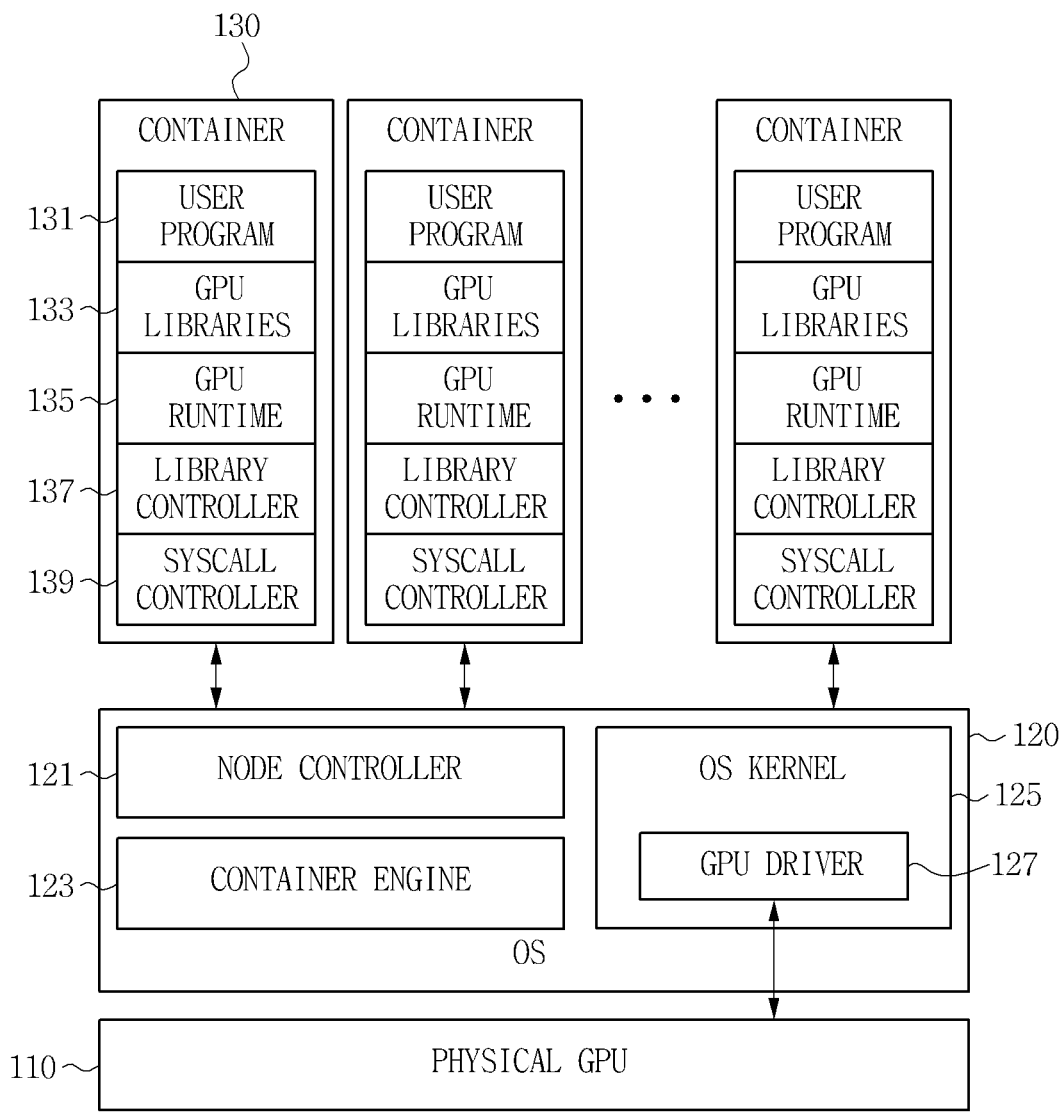
FIG. 1 is a view showing the software structure of a GPU virtualization system based on a container according to an embodiment.

FIG. 1 is a view showing the software structure of a GPU virtualization system based on a container according to an embodiment of the invention.

Referring to FIG. 1, the software structure of a GPU virtualization system 100 is configured of a physical GPU 110, an operating system 120, and a plurality of containers 130.

The operating system 120 is configured of a node controller 121, a container engine 123, and an operating system kernel 125. The operating system 120 communicates with the physical GPU 110 through a GPU driver 127 installed in the operating system kernel 125.

The node controller 121 may transfer a configuration file including resource constraint information and a system call/API profile to the container 130 and store them in the container. The node controller 121 may confirm GPU resource availability and initialize resource information of the node controller. The GPU resources may be GPU processing units and GPU memory, but they are not limited thereto. The node controller 121 may report the confirmed GPU resource availability to a manager and may receive a job assigned by the manager. The node controller 121 may update information on the GPU resource availability, and at this point, it may subtract the resources as much as a requested amount. If a container is created, the node controller 121 may transfer the configuration file including the resource constraint information to the container, and if the end of executing the container is sensed, the node controller 121 may collect the resources as much as a requested amount and update the resource availability information of the node controller. The node controller 121 may execute a code execution request of a user in the container.

The container engine 123 creates and distributes the container 130 and allocates GPU resources so that each container 130 may execute a corresponding application program. The container engine 123 may execute and terminate the container.

The container 130 is a space including an image which combines various programs, source codes and libraries needed for driving a user program. Driving of a user program is practically accomplished in the operating system 120. That is, the operating system 120 may access each container 130 through the container engine 123 and execute and process a corresponding user program.

The container 130 is configured of a user program 131, a GPU library 133, a GPU runtime 135, a library controller 137 and a system call controller 139.

The user program 131 may operate to execute a code execution request of a user of the node controller in the container.

The GPU library 133 may include a library so that a deep learning framework may operate, and for example, at least one of deep learning frameworks such as TensorFlow, Caffe, Pytorch, CNTK and Chainer may operate.

CUDA, OpenCL or ROCM, which are parallel processing algorithms executed in a GPU, may be installed and used in the GPU runtime 135. The CUDA is a GPU middleware utilized in the machine learning field and may operate in the GPU runtime. The OpenCL may operate as parallel processing and a cross platform utilized in the field of machine learning and in high-performance computing (HPC).

When a library function call event of a user program is received, the library controller 137 may determine whether the event is an API call related to inquiry and allocation of GPU resources, change at least one among an argument, a structure field and a return value related to GPU resource amounts, and call an original library function. If the event is not an API call related to inquiry and allocation of GPU resources, the library controller 137 may call the original library function without changing an argument and return the return value as is.

When a system call event of a user program is received, the system call controller 139 determines whether the event is a system call of at least one among permission, block and change according to a predefined API profile, and may change argument and return values before and after the call of a original system call according to rules of the API profile. If the event is not a system call of at least one among permission, block and change according to the predefined API profile, the system call controller 139 may call the original system call without changing an argument and return the return value as is.

That is, as the library controller 137 in the container intercepts the library call and changes arguments related to the GPU resource amounts and the system call controller 139 intercepts the system call and changes argument and return values, a virtual GPU can be implemented.

Figure 2:
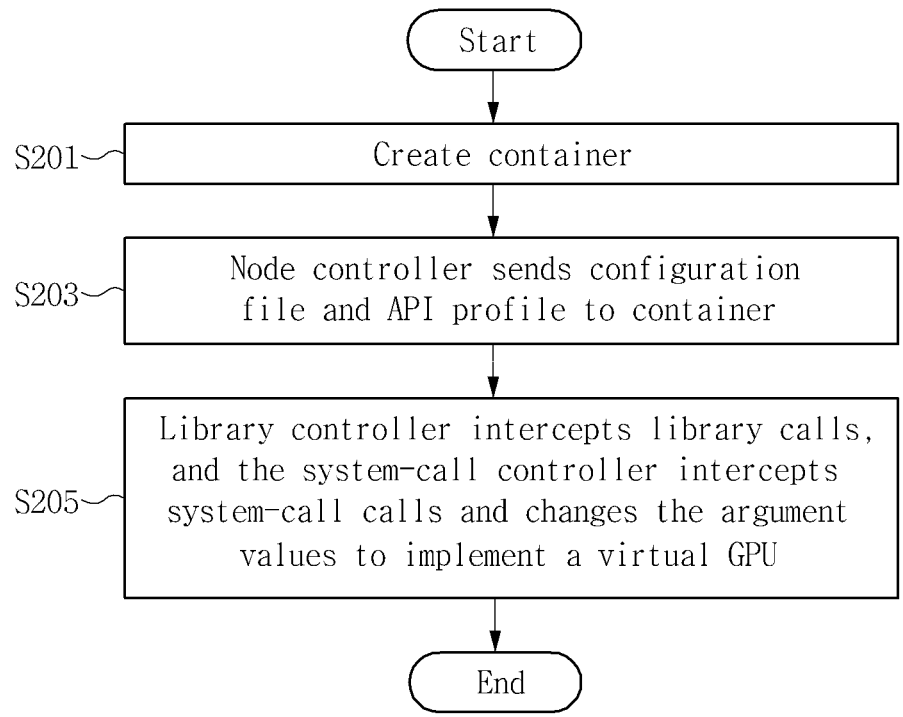
FIG. 2 is a flowchart illustrating a GPU virtualization method based on a container according to an embodiment.

FIG. 2 is a flowchart illustrating a container virtualization method according to an embodiment of the invention.

Referring to FIG. 2, if a container is created (step S201), the node controller 121 transmits a configuration file including GPU resource constraint information and a system call/API profile to the container (step S203). The library controller and the system call controller in the container may receive and store the configuration file including the resource constraint information.

When the container is executed, as the library controller 137 provided in the container intercepts the library call and changes an argument related to the GPU resource amounts, and the system call controller 139 intercepts the system call and changes the argument and return values, the virtual GPU is implemented (step S205). At this point, the library controller 137 may change structure fields and return values, as well as the arguments related to the GPU resource amounts, and call the original library function.

Figure 3:
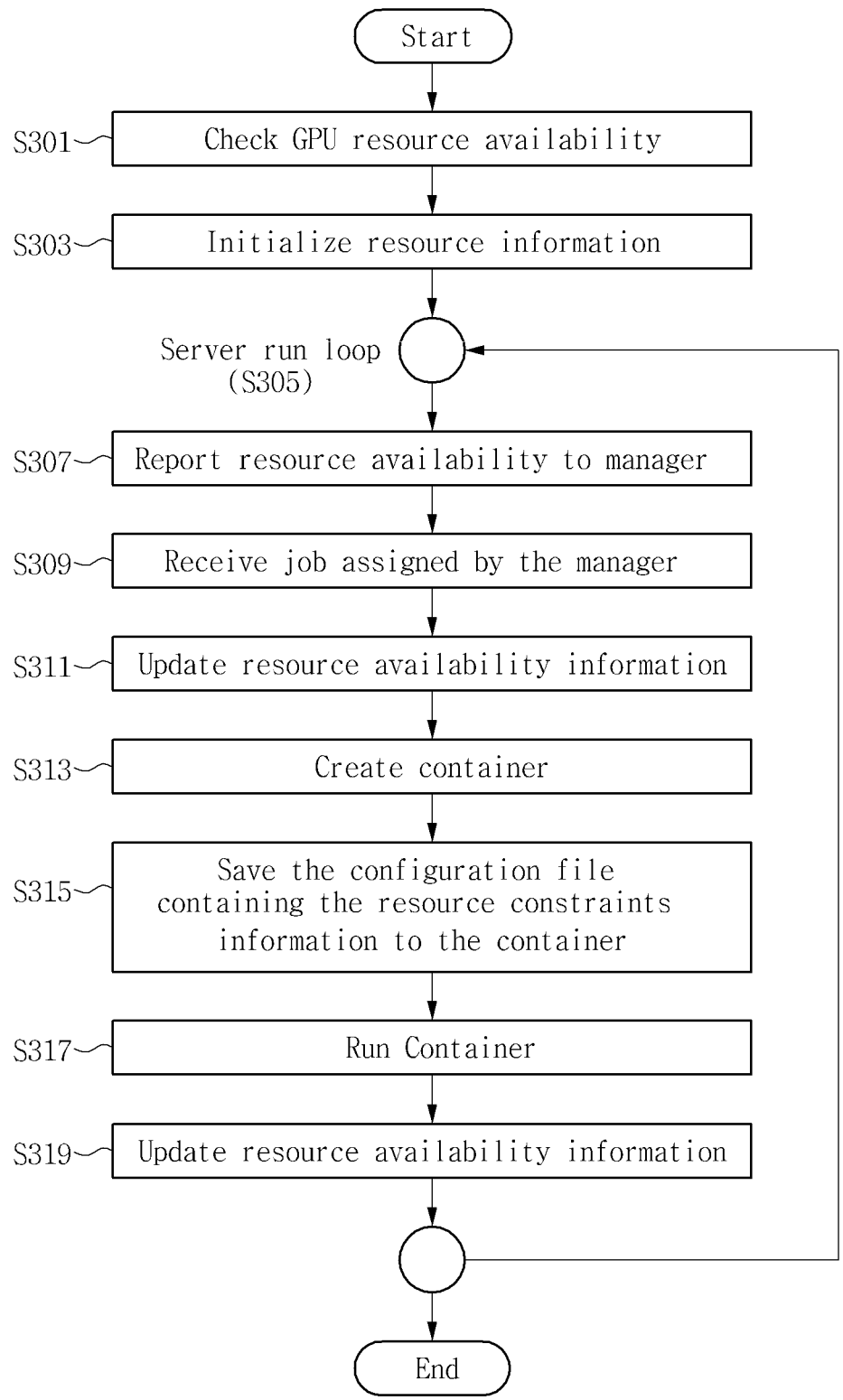
FIG. 3 is a flowchart illustrating an operation method of a node controller according to an embodiment.

FIG. 3 is a flowchart illustrating an operation method of a node controller according to an embodiment of the invention.

Referring to FIG. 3, the node controller first confirms GPU resource availability (step S301). Then, the node controller initializes resource information (step S303).

Hereinafter, the process described below may be repeatedly performed by a server execution loop (step S305). The node controller reports the confirmed GPU resource availability to the manager (step S307). The node controller receives a job assigned by the manager (job specification) (step S309). The node controller 121 updates resource availability information (step S311). At this point, the resources may be subtracted as much as a requested amount. Then, a container is created (step S313), and the configuration file including the resource constraint information, which will be read by the library controller and the system controller, is transmitted to the container and stored in the container (step S315). Then, the container is executed (step S317), and the resource availability information of the node controller is updated (step S319) if the end of executing the container is sensed. At this point, the node controller may collect the resources as much as a requested amount.

Figure 4:
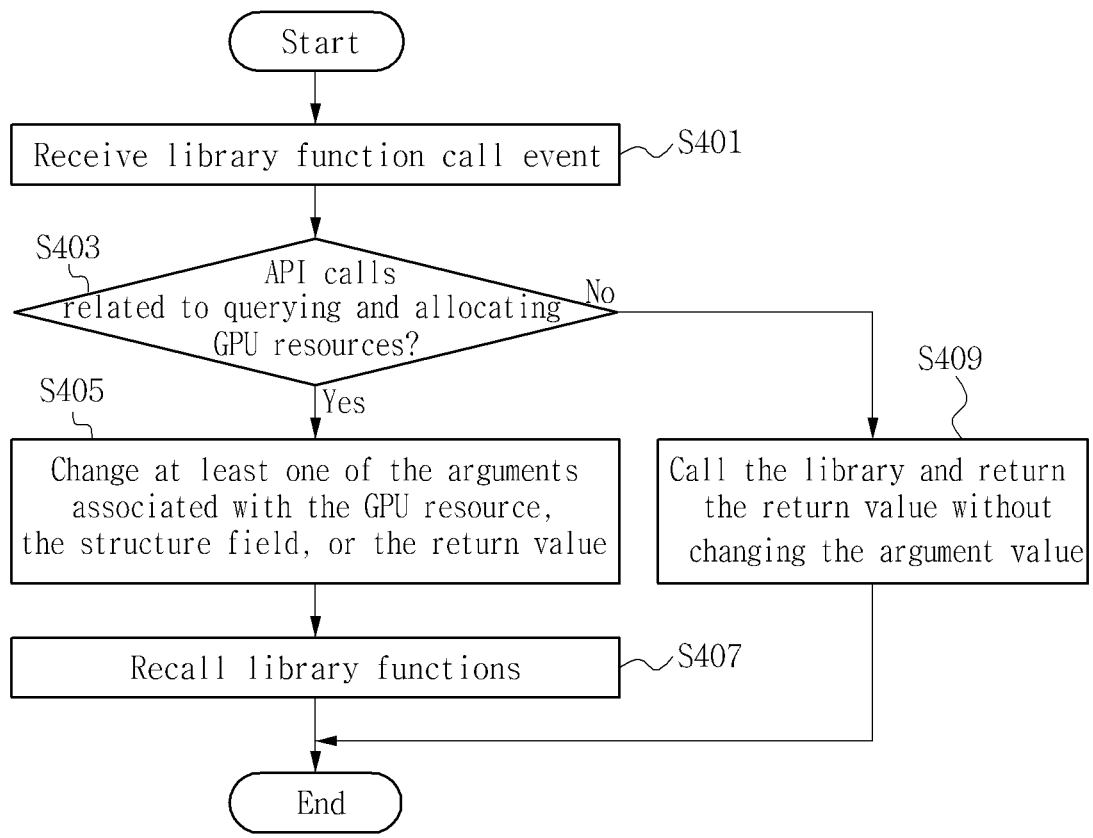
FIG. 4 is a flowchart illustrating an operation method of a library controller according to an embodiment.

FIG. 4 is a flowchart illustrating an operation method of a library controller according to an embodiment of the invention.

Referring to FIG. 4, the library controller receives a library function call event of a user program (step S401). Then, the library controller determines whether the event is an API call related to inquiry and allocation of GPU resources (step S403).

If the event is an API call related to inquiry and allocation of GPU resources as a result of the determination, the library controller changes at least one among an argument, a structure field and a return value related to GPU resource amounts (step S405). At this point, they may be changed on the basis of an embedded API profile and the configuration file of the container.

Then, after at least one among an argument, a structure field and a return value is changed, the library controller calls the original library function (step S407).

If the event is not an API call related to inquiry and allocation of GPU resources as a result of the determination, the library controller calls the original library function without changing an argument and returns the return value as is (step S409).

Figure 5:
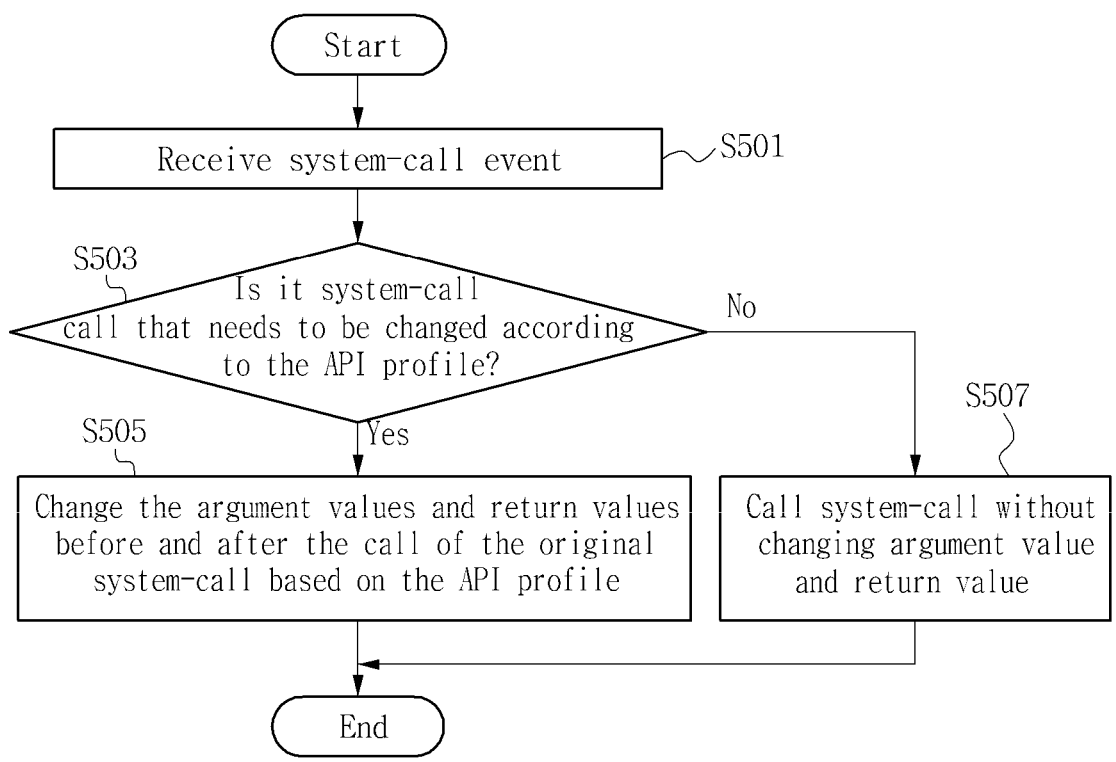
FIG. 5 is a flowchart illustrating an operation method of a system controller according to an embodiment.

FIG. 5 is a flowchart illustrating an operation method of a system controller according to an embodiment of the invention.

Referring to FIG. 5, the system controller receives a system call event of a user program (step S501). The system controller determines whether the event is a system call which needs a change in a predefined API profile (step S503). At this point, the system controller may determine whether it is a case which needs a permission or a block, as well as a change. If the event is a system call which needs a permission, a block or a change as a result of the determination, the system controller changes the argument and return values before and after the call of original system call according to rules of the API profile (step S505).

If the system call does not need a permission, a block or a change as a result of the determination, the system controller calls the original library function without changing an argument and returns the return value as is (step S507).

While the invention has been described with reference to the embodiments shown in the figures, this is only an example, and those skilled in the art may understand that various modifications and equivalent other embodiments are possible from the description. Therefore, the true scope of the invention should be defined by the technical spirit of the appended claims.

The invention claimed is:

1. A GPU virtualization method based on a container, the method comprising the steps of:
   transmitting, when the container is created, a configuration file including GPU resources constraint information and an API profile to the container, by a node controller; and
   implementing a virtual GPU, when the container is executed, by intercepting a library call and changing an argument related to a GPU resource amount by a library controller provided in the container, and by intercepting a system call and changing argument and return values of the system call by a system call controller,
   wherein the node controller confirms GPU resource availability, initializes resource information of the node controller, reports the GPU resource availability to a manager, receives a job assigned by the manager, and updates GPU resource availability information of the node controller by subtracting GPU resources as much as a requested amount, the requested amount is the GPU resource amount requested based on the assigned job,
   wherein the container is one of a plurality of containers,
   wherein an operating system of a GPU virtualization system includes the node controller and a container engine, the container engine creates, executes and terminates the plurality of containers,
   wherein each of the plurality of containers separately includes a user program, GPU libraries, a GPU runtime, the library controller and the system call controller,
   wherein driving of the user program of each of the plurality of containers is accomplished in the operating system, the operating system accesses each of the plurality of containers via the container engine, and the operating system execute and process the user program such that the plurality of containers share the operating system of the GPU virtualization system,
   wherein the library and system calls are intercepted in the plurality of containers running in the shared single operating system, carrying out a virtualization at library and system call layers.

2. The method according to claim 1, wherein the node controller stores the configuration file including resource constraint information in the container when the container is created, and collects the GPU resources as much as a requested amount and updates the GPU resource availability information of the node controller if an end of executing the container is sensed.

3. The method according to claim 1, wherein when a library function call event of a user program is received, the library controller determines whether the event is an API call related to inquiry and allocation of the GPU resources, in determining that the event is the API call related to the inquiry and allocation of the GPU resources, changes at least one among an argument, a structure field and a return value related to GPU resource amounts, and calls an original library function, and in determining that the event is not the API call related to the querying and the allocation of the GPU resources, returns the return value without changing the argument.

4. The method according to claim 1, wherein when a system call event of a user program is received, the system call controller determines whether the event is a system call of at least one among permission, block and change according to a predefined API profile, in determining that the event is the system call of the at least one among permission, block and change according to the predefined API profile, changes argument and return values before and after the call of original system call according to rules of the API profile, and in determining that the event is not the system call of the at least one among permission, block and change according to the predefined API profile, returns the return value without changing the argument.

5. The method according to claim 1, wherein the GPU libraries in at least one of the plurality of containers are configured to operate at least one deep learning framework, and at least one parallel processing algorithms are installed and used in the GPU runtime of each of the plurality of containers.

6. The method according to claim 1, wherein the operating system, shared by the plurality of containers, further includes an operating system kernel, the operating system communicates with a physical GPU through a GPU driver installed in the operating system kernel.

7. A GPU virtualization system based on a container, the system comprising:
an operating system including a node controller for transferring a configuration file including resource constraint information and a system call/API profile to the container; and
the container configured of a library controller for determining, when a library function call event of a user application is received, whether the event is an API call related to inquiry and allocation of GPU resources, in determining the event is the API call related to the inquiry and allocation of the GPU resources, changing at least one among an argument, a structure field and a return value related to GPU resource amounts, and in determining the event is not the API call related to the querying and the allocation of the GPU resources, calling an original library function, and returning the return value without changing the argument, and a system controller determining, when a system call event of the user program is received, whether the event is a system call of at least one among permission, block and change according to a predefined API profile, and changing argument and return values of the system call before and after a call of original system call according to rules of the API profile,
wherein the node controller confirms GPU resource availability, initializes resource information of the node controller, reports the GPU resource availability to a manager, receives a job assigned by the manager, and updates GPU resource availability information of the node controller by subtracting the GPU resources as much as a requested amount, the requested amount is the GPU resource amount requested based on the assigned job,
wherein the container is one of a plurality of containers,
wherein the operating system of the GPU virtualization system further includes a container engine, the container engine creates, executes and terminates the plurality of containers,
wherein each of the plurality of containers separately includes a user program, GPU libraries, a GPU runtime, the library controller and the system call controller,
wherein driving of the user program of each of the plurality of containers is accomplished in the operating system, the operating system accesses each of the plurality of containers via the container engine, and the operating system execute and process the user program such that the plurality of containers share the operating system of the GPU virtualization system,
wherein the library and system calls are intercepted in the plurality of containers running in the shared single operating system, carrying out a virtualization at library and system call layers.

8. The system according to claim 7, wherein the GPU libraries in at least one of the plurality of containers are configured to operate a deep learning framework, and at least one parallel processing algorithms are installed and used in the GPU runtime of each of the plurality of containers.

9. The system according to claim 7, wherein the operating system, shared by the plurality of containers, further includes an operating system kernel, the operating system communicates with a physical GPU through a GPU driver installed in the operating system kernel.

* * * * *

UNITED STATES PATENT AND TRADEMARK OFFICE
CERTIFICATE OF CORRECTION

PATENT NO. : 11,221,888 B2
APPLICATION NO. : 16/859167
DATED : January 11, 2022
INVENTOR(S) : Kim et al.

Page 1 of 1

It is certified that error appears in the above-identified patent and that said Letters Patent is hereby corrected as shown below:

On the Title Page

Under item (72) Inventors Joon Gi Kim, please change country from DE to "KR"

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*